(12) United States Patent
Schramel

(10) Patent No.: US 7,574,115 B2
(45) Date of Patent: Aug. 11, 2009

(54) METHOD TO SELECT RECORDINGS BY THEIR DURATION

(75) Inventor: Johannes Peter Schramel, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 1039 days.

(21) Appl. No.: 10/507,193

(22) PCT Filed: Feb. 18, 2003

(86) PCT No.: PCT/IB03/00647

§ 371 (c)(1),
(2), (4) Date: Sep. 9, 2004

(87) PCT Pub. No.: WO03/077546

PCT Pub. Date: Sep. 18, 2003

(65) Prior Publication Data

US 2005/0226602 A1    Oct. 13, 2005

(30) Foreign Application Priority Data

Mar. 14, 2002  (EP)  ................................. 02100248

(51) Int. Cl.
*H04N 5/91* (2006.01)
(52) U.S. Cl. ...................... 386/124; 369/124.06; 360/32
(58) Field of Classification Search .................. 386/46, 386/94, 95, 124–126; 360/15, 32; 369/13, 369/59, 84, 124.06
See application file for complete search history.

(56) References Cited

U.S. PATENT DOCUMENTS 5,224,087 A * 6/1993 Maeda et al. ............ 369/53.12
5,406,428 A * 4/1995 Suzuki ........................ 360/53
5,982,364 A * 11/1999 Beckwith .................... 715/723
6,205,104 B1 * 3/2001 Nagashima et al. ...... 369/59.14

FOREIGN PATENT DOCUMENTS

EP        0758832        2/1997

* cited by examiner

*Primary Examiner*—Robert Chevalier
*Assistant Examiner*—Mishawn Dunn

(57) ABSTRACT

The invention relates to a method for the selection of stored video programs ($S_i$) in which, together with the video program ($S_i$), their running time ($t_{Di}$) and, if necessary, an information item ($I_i$) about the content, for example the genre, are stored and also a playback device (1) for video programs ($S_i$). To take account of a specified time interval ($\Delta T$) and optimally utilize said time duration ($\Delta T$), provision is made, on the basis of the specified time duration ($\Delta T$), for those video programs ($S_n$) to be automatically selected from the stored video programs ($S_i$) whose running time ($t_{Dn}$), multiplied by any applicable compression factor (Cn), is shorter than or equal to the specified time duration ($\Delta T$). As a result of the method according to the invention, all those video programs ($S_n$) are consequently offered whose duration with the applicable compression, if any, is within the specified time duration ($\Delta T$). Furthermore, as a result of compression of a subsequent video program ($S_F$) transmitted after the time duration ($\Delta T$), the available time duration ($\Delta T$) can be prolonged and, consequently, the offer of those video programs ($S_n$) that are within the prolonged time duration ($N \times \Delta T$) can be increased.

26 Claims, 3 Drawing Sheets

METHOD TO SELECT RECORDINGS BY THEIR DURATION

Figure 1:
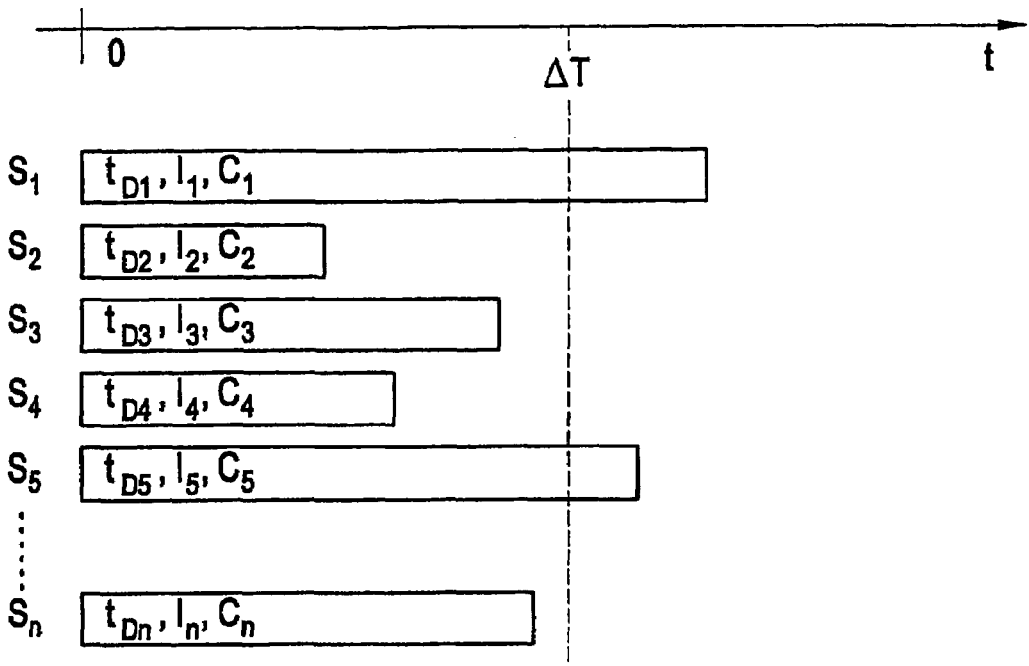

The invention relates to a method of selecting stored video programs, in which, together with the video programs, their running time and, if required, an information item about the content, for example of the genre, are stored.

The invention furthermore relates to a playback device for video programs having at least one memory device for the video programs and their running time.

The term "video programs" includes audiovisual video sequences, in particular video films, which may be stored in various ways. In particular, the present invention relates to devices that are suitable for storing a multiplicity of such video programs. These include, in particular, hard-disk recorders, so-called media servers, and also DVD (digital versatile disk) recorders. In order to make possible an easy selection, in particular from a multiplicity of video programs, there are methods and/or devices in which video programs can be selected, for example, according to their genre. As a result of the latter, although a user can be supported in regard to his preferences, he cannot be supported in regard to the utilization of the time available to him. Because of the shortness of time, it is frequently necessary to interrupt the playback of video programs and continue them at a later time. With today's fast-moving times, it is desirable to divide up the time available optimally.

To optimize the time available, methods are known with which films can be played back more rapidly by skipping, for example, commercial breaks or playing back sequences having a slow scene change more quickly. With the aid of such compression methods, it is possible to shorten the normal playing time of video programs within a certain factor, which is normally between 1 and 2. In such compression methods, for example, commercial breaks are detected and skipped or slow picture sequences are accelerated and the sound is altered during the process in such a way that the speech intelligibility is maintained at a constant sound level despite syllables being removed. Furthermore, sequences in which the motion vector drops below a specified value can be automatically eliminated or film repetitions, for example after commercial breaks, can be automatically detected and likewise skipped. For example, EP 758 832 A2 discloses a compression method for video signals in which the number of pictures to be skipped depends on the size of the motion vector determined. As a result of the compression, the usual time pattern of video films, which is generally 30 minutes, can be shortened and the running time of video programs can be matched better to the particular requirements of the user.

The problem of optimally utilizing a specified time interval is also not eliminated by said compression methods since the time shortening achievable by the compression is not known in advance and, consequently, no conclusion can be drawn as to whether a certain video program can be accommodated in a specified time interval even using a compression method.

It is therefore an object of the present invention to provide a method for selecting stored video programs that takes account of a specified time interval and, consequently, uses the specified time interval optimally.

It is a further object of the present invention to provide a playback device for video programs with the aid of which a specified time interval can be optimally used.

The object according to the invention is achieved by a method of selecting stored video programs in which, at least together with the video programs, their running time and, if necessary, an information item about the content, for example of the genre, are stored and in which, on the basis of a specified time duration, those video programs are automatically selected from the stored video programs whose running time, multiplied by any applicable compression factor, is shorter than or equal to the specified time duration. The specified time duration may be defined, for example, by a user or it may be automatically detected as, for example, in the case of a time duration of commercial inserts during a live program. The method consequently permits the stipulation of a time duration by the user or the recognition of a time duration, whereupon those video programs are automatically selected from all the stored video programs whose running time, multiplied by any applicable compression factor, is shorter than or equal to the specified time duration. The time duration may also be fixed indirectly as a result of the selection of a desired subsequent program (for example, a live transmission), which automatically sets the finishing time. Consequently, the specified time duration is optimally utilized and the user is offered, on the one hand, those video programs that fit into the specified time interval at the original playback speed and, on the other hand, if compression methods known per se are available, he is also offered those video programs that fit into the time interval taking account of the compression. As a result of the application of compression methods known per se, a further utilization of the available time interval can be achieved by leaving out certain scenes, such as, for example, commercial breaks or the like. The compression factor mentioned is the mean or effective compression factor of a video program that is made up of the compression factors of individual scenes in the video program. The method according to the invention can also be used to insert short video programs that fit from a memory during a time interval specified, for example, by commercial inserts during a live connection.

The object according to the invention is also achieved by a method of selecting stored video programs in which, with the video programs, their running time and, if necessary, an information item about the content, for example of the genre, are stored, wherein, on the basis of a specified time duration up to a subsequent video program having specified transmission start and an anticipated transmission end, those video programs are automatically selected from the stored video programs whose running time, multiplied by any applicable compression factor is shorter than or equal to N times the specified time duration, where N is typically between 1 and 2 and wherein the subsequent video program is additionally played back with a time offset and (if required) also in a partially compressed form so that the anticipated transmission end of the subsequent video program, which may, for example, be a live program, is adhered to. That is achieved by the recording and simultaneously section-wise compressed playback of the subsequent program, as a result of which the starting time is delayed, but the finishing time is maintained. The size of the factor N is determined by the length of the subsequent video program and the possible compression and is normally between 1 and 2.

Apart from the selected video programs mentioned, combinations of a plurality of video programs may, in addition, also be selected automatically wherein the sum of the running time, multiplied by any applicable compression factor of each video program in the combination is shorter than or equal to the specified time duration, or is shorter than or equal to N times the specified time duration where N is between 1 and 2. As the result, with selected video programs of short running time, a still more optimum utilization of the time duration available can be achieved since combinations of a plurality of video programs can also be offered.

If information items about the content, for example of the genre, of the video programs are stored, a further selection can also take place according to said content information items in that, on the basis of information specified by the user, those video programs can be selected from the selected video programs whose content information corresponds to the user's requirement. For example, the user can choose the feature films genre, whereupon only those feature films are offered from the multiplicity of video programs that lie within the abovementioned time interval. This further restriction of a selection is, of course, also applicable to a combination of a plurality of video programs.

In the same way, the video programs can be selected on the basis of an information item of the subsequent video program, for example the genre of the subsequent video program and, consequently, the video programs offered for the specified time duration can be matched to the genre of the subsequent program, wherein suitable combinations can be predefined depending on the user.

The applicable compression factors, if any, can be determined during the recording of a video program or, for example, already be concomitantly transmitted by the broadcasting station and stored together with the stored video program. This requires the compression method used by the broadcasting station or the video producer to be known.

In the same way it is possible for the compression to be performed by the present method, the compression factor of a video program being determined during the recording of the video program. For example, during the recording of a video program, the commercial breaks can be detected and a mean compression factor can be calculated therefrom by determining the time saving due to skipping the commercial breaks. In the same way, it is possible for the present method to offer a plurality of compression methods and to store all the compression factors for all the possible compression methods together with the video program.

In addition, it is also possible to perform the determination of the compression factor after storing the video program in a separate run. This determination of compression factors by various compression methods can take place without affecting the user, for example during night hours, or in a separate process that does not affect the storage and playback of other video programs.

In accordance with a further feature of the invention, provision is made for the user to enter an identification code. On the one hand, certain user rights can thereby be granted and, on the other hand, certain user habits can be detected. For example, by issuing certain identification codes for children, the latter can be excluded from the selection of video programs of particular genres.

For the last mentioned purpose, provision is made for the video programs to be selected as a function of parameters assigned to the identification code.

For example, the parameters assigned to the identification code may contain a selection of permissible content information items. The abovementioned restriction of the selection of video programs of certain genres, for example for children, can thereby be performed. In addition, further restrictions or more precise statements in the selection of video programs are thereby possible with such parameters.

However, for statistical purposes, it is expedient for the purpose of drawing up a user profile to store the inputs of a user together with the identification code. By logging these inputs, such as usual operating times of the user and also mean time intervals specified by the user or frequently selected information items about the content of video programs, information items can be obtained which may be used for the more systematic selection of video programs or the suitable arrangement of the selected video programs.

In addition, the video programs may also be selected as a function of the absolute time, as a result of which account can be implicitly taken of the user's preferences. For example, at times at which children normally view video programs, such video programs can be mainly offered or the arrangement of the selected video programs can be undertaken from this point of view.

In addition, the applicable compression, if any, of the video programs can take place as a function of the running time of the video program since, according to experience, the beginning and the end of the program are followed with greater attention than the middle part. However, there may be genres for which a compression is not advisable, for example, in the case of information programs. For this reason, the video programs may also be compressed as a function of the information about the content, for example the genre of the video program.

The present invention is also achieved by a playback device for video programs having at least one memory device for the video programs and their running time, furthermore having a control unit for the selection of those video programs from the stored video programs whose running time, multiplied by any applicable compression factor is shorter than or equal to N times a specified time duration, where N is between 1 and 2. It should be noted that the time duration can be specified by a user by the input of said time duration in absolute or relative numbers or by the selection of a subsequent program. After the selection of the time duration, those video programs are selected with the aid of the control unit whose running time, multiplied by any applicable compression factor, is shorter than or equal to N times the specified time duration, where N is between 1 and 2. Insofar as the factor N ought to be greater than the maximum possible in order not to miss the start of the subsequent program, a subsequent program may also be played back at least partly in compressed form so that the anticipated end of the subsequent video program can be adhered to. The playback device may be a device that is also suitable for recording video programs or a pure playback device that receives the video programs to be played back from an external database that is, for example, accessible via the Internet. In order to be able also to offer combinations of video programs, video programs that fit are selected in the control unit and offered for selection. An input unit is preferably provided in the playback device for the entry of the specified time duration by a user. In addition to entering the time duration, the time duration may also be automatically detected. For example, the time duration arising as a result of commercial insertions during a live program can be determined.

Advantageously, a memory device is furthermore provided for information about the content, for example the genre, of the video programs, which memory device is connected to a control device for the selection of those video programs from the selected video programs whose content information corresponds to a user's requirement. The memory device contains an information item that is associated with the video programs and that can be used for the further selection of video programs. A control unit is used for the selection that may be identical to the abovementioned control unit for the selection of those video programs from the stored video programs whose running time, multiplied by any applicable compression factor, is shorter than or equal to N times the specified time duration. The user's input can take place by entering a certain keyword, such as, for example, feature film or documentation or also by selection from a specific list of content information items. Other information items, such as, for example, the original transmission time or the production year of the film or much more can be specified for the video program in addition to the genre of a video program.

Preferably, a memory device is provided for at least one compression factor assigned to the video programs. If various compression methods are applied, a plurality of compression factors that can be offered for selection in the selection of video programs that fit can be stored for each video program. It should be stressed that the memory devices for the video programs, the information about the content of the video programs and also the compression factors may also, of course, be formed by one memory device.

To achieve reliability of access, on the one hand, but also to detect user-specific information items, an input unit for the entry of a user identification code is preferably provided which is preferably identical to the input unit, already mentioned, for entering the time duration.

To draw up a user profile, a database for storing the time duration entered in association with an identification code and, if necessary, input of an information item about the content of the video programs may be provided, which database is preferably connected to the control unit.

In order to be able to determine the effective compression factor of video programs, a summing unit is provided, which summing unit is connected to the control unit. The effective compression factor N of a video program is smaller than compression factors of individual scenes. For example, by leaving out the commercial breaks, the compression factor N=infinity is reached, whereas in scenes having a lot of movement or alterations only values between 1 and 2 are expedient.

To perform the compression method of video programs in the playback device according to the invention, at least one compression device is provided by means of which the playback of the video program can be compressed.

Preferably, a device for selecting the method of compression of the video program also exists in order to be able in this way to stipulate various compression methods, on the one hand, and on the other hand, the actual presence of the compression. For example, the possibility of compression may also be switched off completely.

In order to make possible a time-offset and compressed playback of subsequent video programs after the time duration entered by the user, it is necessary to record the subsequent program and to play it back even during the recording of the beginning already optionally compressed. This may, for example, take place with a memory device for the temporary storage of video signals during the playback. If the playback time has reached the broadcasting time, the compression of the video program can be switched off. As a result of this feature, the available time duration can be extended if it depends on the start of transmission of a subsequent video program.

To log the absolute time, a timer is preferably provided that is connected to the control unit. The absolute time can thereby also be taken into account in the selection of video programs.

These and other aspects of the invention are apparent from and will be elucidated with reference to the embodiments described hereinafter, to which the invention is, however, not restricted.

Figure 3:
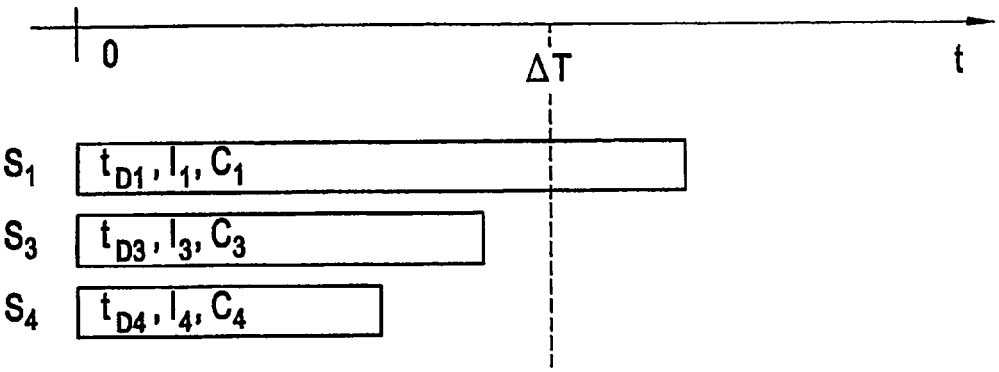
Figure 4:
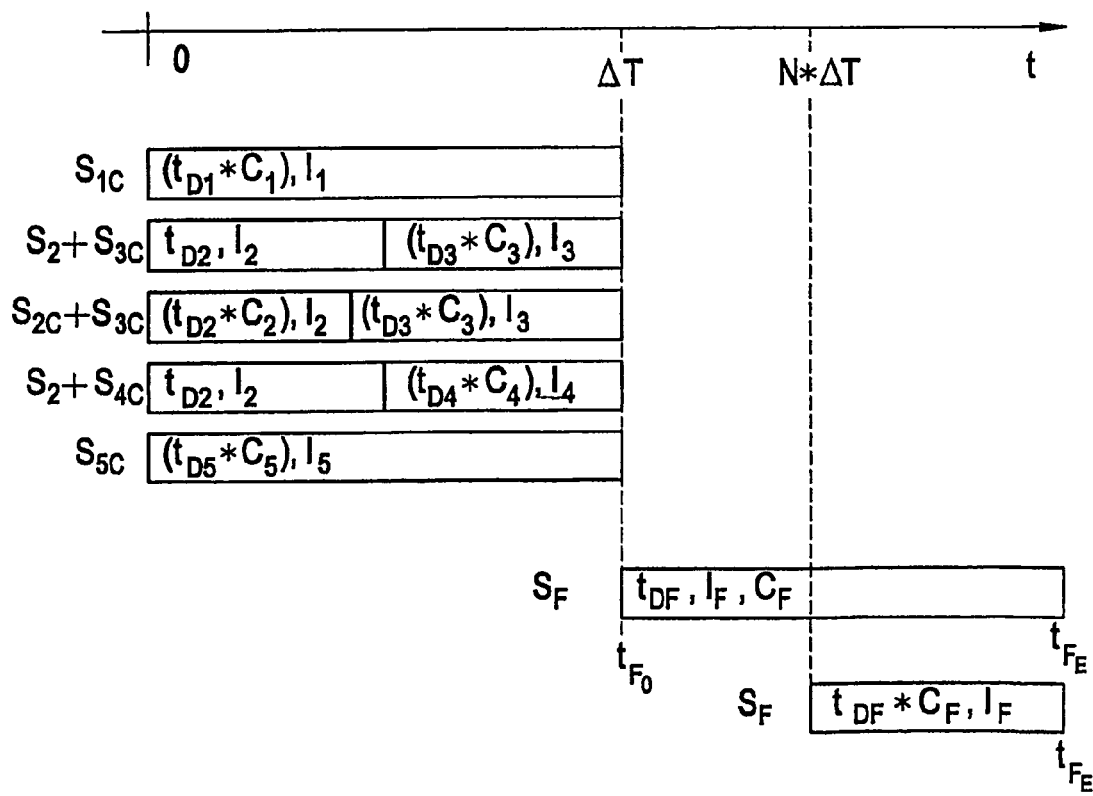
Figure 5:
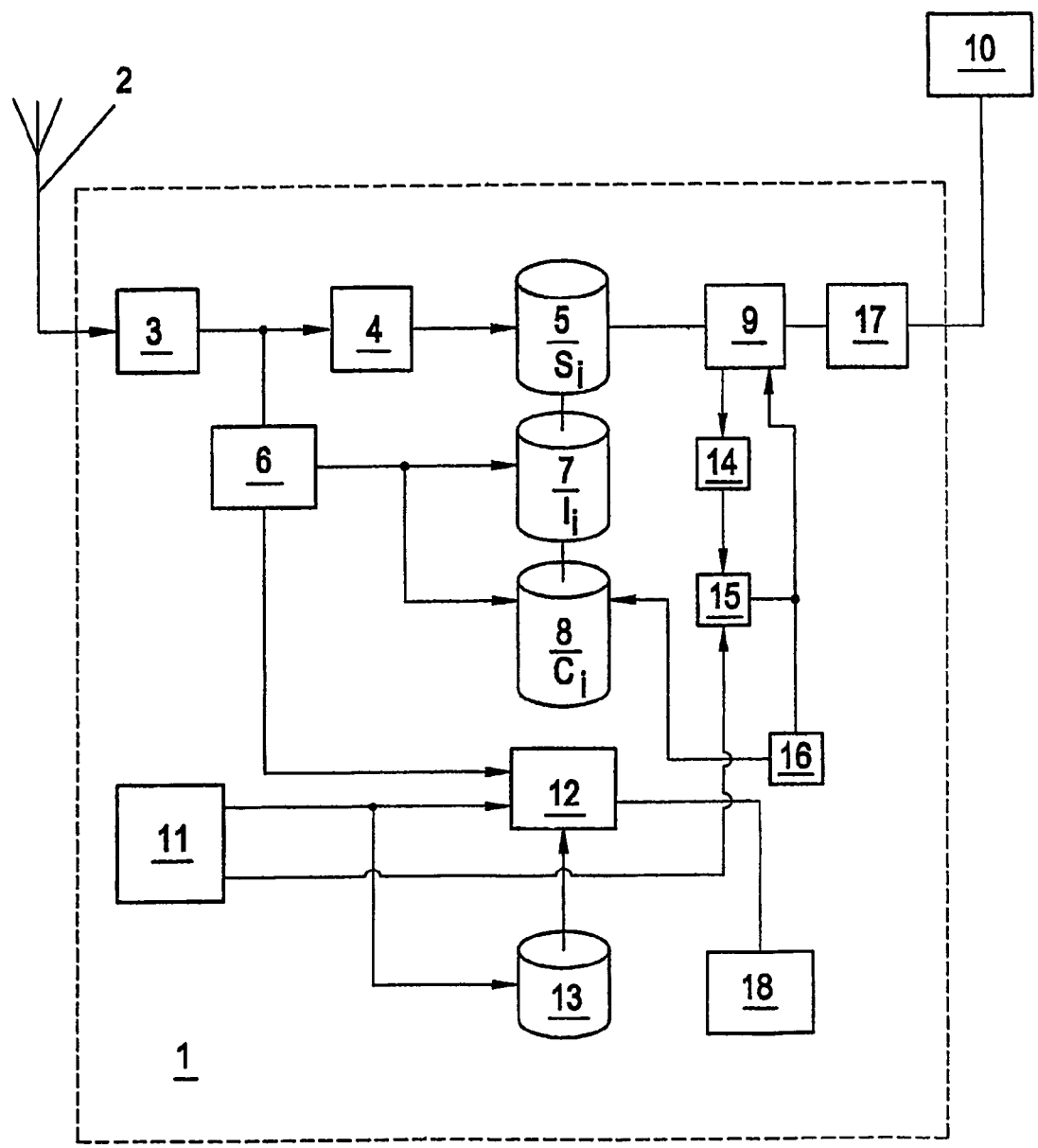

In the drawings:

FIGS. 1 to 4 show various time sequences for explaining the method according to the invention and FIG. 5 shows a schematic block circuit diagram of a playback device in accordance with the invention.

FIG. 1 shows a schematic time sequence of video signals $S_i$ as a function of the time t. At the time t=0, a user specifies a certain time duration $\Delta T$ during which he intends to view video programs $S_i$. From a multiplicity of stored video programs $S_i$, those video programs $S_i$ to $S_n$ are selected by the method according to the invention whose running time $t_{D1}$ to $t_{Dn}$, multiplied by any applicable compression factor $C_1$ to $C_n$, may be shorter than or equal to the specified time duration $\Delta T$. In this process, the running time $t_{Di}$ and the compression factor $C_i$ are stored together with the video program $S_i$ on a certain medium, for example a hard disk. If, for example, the possibility of compression of the video signals $S_i$ is not desired, only those video programs $S_i$ are selected whose running time $t_{Di}$ is within the specified time duration $\Delta T$. In the example shown, these would be the programs $S_2$, $S_3$, $S_4$ and $S_n$. In addition to the running time $t_{Di}$ and the applicable compression factor $C_i$, an information item $I_i$ about the content of the video program $S_i$, for example of the genre, can also be stored with the video program and on the basis thereof a further selection may take place.

Figure 2:
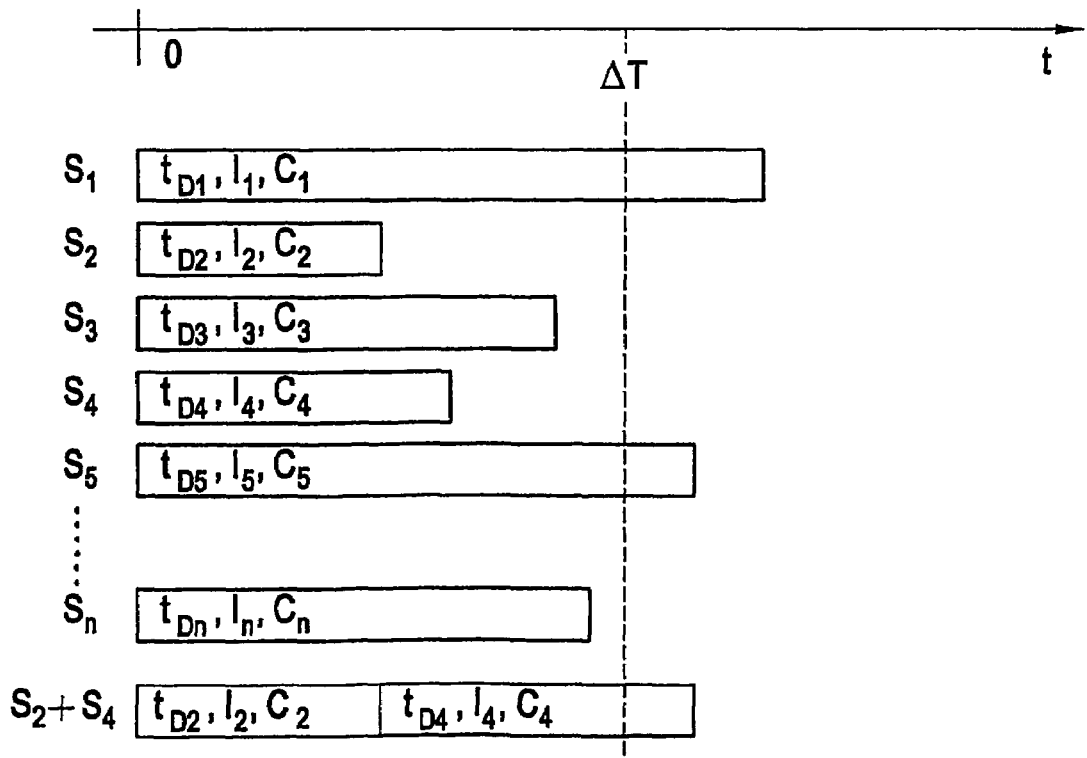

In addition to the possible video programs $S_i$ that can be viewed within the specified time duration $\Delta T$, it is also possible, in accordance with FIG. 2, for combinations of video programs $S_i$ to be offered, whereby the sum of the running time $T_{Di}$, multiplied by any applicable compression factor $C_i$ of each video program $S_i$ in the combinations is shorter than or equal to the specified time duration $\Delta T$. In the example shown, in addition to the video programs $S_1$ to $S_n$, the combination of the video programs $S_2+S_4$ is also offered and their running time $t_{D2}$ multiplied by the compression factor $C_2$ and $t_{D4}$ multiplied by the compression factor $C_4$ is shorter than or equal to the specified time duration $\Delta T$.

FIG. 3 shows a selection of video programs $S_i$ in which a certain genre was chosen that is contained only in the information items $I_1$, $I_3$ and $I_4$ of the video programs $S_1$, $S_3$ and $S_4$. Accordingly, only the video programs $S_1$, $S_3$ and $S_4$ are offered that have the genre selected by the user or another information item.

FIG. 4 shows a further example of the application of the method according to the invention in which the user intends to view a further video program $S_F$ after the conclusion of the specified time duration $\Delta T$. Accordingly, the video programs or combinations thereof selected by the method according to the invention are arranged and, if necessary, compressed in such a way that the end coincides as much as possible with the desired time according to the time interval $\Delta T$. Accordingly, in the example shown, the video program $S_{1C}$ in compressed form with the definitive running time $t_{D1} \times C_1$, the combination of video programs $S_2$ and $S_{3C}$ in compressed form, furthermore the combination of the video program $S_{2C}$ in compressed form and the video program $S_{3C}$ in compressed form, furthermore the combination of the video programs $S_2$ and $S_{4C}$ in compressed form and finally the video program $S_5$ in compressed form are offered. As a result, an optimum utilization of the available time interval $\Delta T$ specified by the user takes place. It goes without saying, a video program that accidentally fits could also be offered uncompressed.

In addition, with the possibility of a time-offset and compressed playback of the subsequent video program $S_F$, the available time duration $\Delta T$ can be prolonged by a factor N, which is usually between 1 and 2, and the offer of possible video programs can thereby be increased in the extended time interval $N \times \Delta T$. The subsequent program $S_F$ is then played back with a time offset and in partly compressed form so that it ends at the envisaged end $t_{FE}$ of the program $S_F$.

Finally, FIG. 5 shows a block circuit diagram of a playback device 1 for video programs, which may be formed, for example, by a hard-disk recorder (media server) or another memory medium. The video signal originating, for example, from an antenna 2, a cable or the like, reaches an input circuit 3, which may be formed, for example, by an analog tuner or a digital tuner or by a suitable interface for the Internet. The signal can then reach a data reduction device 4 before it is stored in a memory device 5. Between the input circuit 3 and the data reduction device 4, the signal reaches a data extraction device 6, in which information items relating to stored video programs $S_i$, such as running time $t_{Di}$ and other information items $I_i$ about the content are extracted and stored in appropriate memory devices 7, 8. The video programs $S_i$ stored in the memory device 5 finally reach an output circuit 9, which may be formed by a decoder, and, finally, a display device 10, for example a television set. In the playback device 1, an input unit 11 may be provided for the input of a time duration $\Delta T$ by a user, which input unit is connected to a control unit 12 for the selection of those video programs $S_n$ from the memory device 5 whose running time $t_{Dn}$, multiplied by any applicable compression factor $C_n$ stored in the memory device 8 is shorter than or equal to the specified time duration $\Delta T$. After the selection of the video programs $S_n$, these are played back, for example, on the display device 10. The input unit 11 may also be used to enter a user's identification code, whereby the user-specific input data may be stored in a database 13 for drawing up user profiles or for statistical purposes. Furthermore, compression of the video programs $S_i$, which may be brought about with the aid of a device 15 for the selection of the method of compression, may be selected by means of the input unit 11. The appropriate compression takes place before the playback of the video program $S_i$ by means of a compression device 14. Finally, a summing unit 16 is used to sum the compression factors of individual scenes and to determine the effective compression factor of the entire video program. For the time-offset and compressed playback of subsequent video programs $S_F$, it is necessary to record the subsequent video program $S_F$ and play back the start already, optionally, in compressed form even during the recording. This can take place with a memory device 17 for the temporary storage of video signals $S_i$ during the playback. To take account of the absolute time, a timer 18 may be provided that is connected to the control unit 12.

The invention claimed is:

1. A method of selecting stored video programs ($S_i$) in which, together with the video programs ($S_i$), respective running times ($t_{Di}$) of the video programs and respective information items ($I_i$) about content of the respective video programs are stored, said method comprising the steps of:
    multiplying the respective running times of the scored video programs any applicable compression factor ($C_n$) thereby forming respective modified running times; and
    selecting the video programs having respective modified running times shorter than or equal to a specified time duration ($\Delta T$).

2. A method of selecting stored video programs ($S_i$) in which, with video programs ($S_i$), respective running times ($t_{Di}$) and respective information items ($I_i$) about content of the respective video programs are stored, said method comprising the steps of:
    multiplying the respective running times of the stored video programs by any applicable compression factor ($C_n$) thereby forming respective modified running times;
    selecting, on the basis of a specified time duration ($\Delta T$) up to a subsequent video program ($S_F$) having specified transmission start ($t_{F0}$) and an anticipated transmission end ($t_{FE}$), video programs ($S_n$) from the stored video programs ($S_i$) having respective modified running times shorter than or equal to N times the specified time duration ($\Delta T$), where N is between 1 and 2; and
    playing back the subsequent video program ($S_F$) with a time offset and in a compressed form so that the anticipated transmission end ($t_{FE}$) of the subsequent video program is adhered to.

3. The method as claimed in claim 1, wherein said method further comprises:
    forming combinations of a plurality of video programs ($S_n$) in which a sum of the modified running times is shorter than or equal to N times the specified time duration ($\Delta T$), where N is between 1 and 2.

4. The method as claimed in claim 1, wherein said method further comprises the step of:
    selecting, on the basis of an information item ($I_B$) specified by a user, those video programs ($S_G$) from the selected video programs ($S_n$) having respective content information ($I_G$) corresponding to the user-specified information item ($I_B$).

5. The method as claimed in claim 2, wherein said method further comprises the step of:
    selecting, on the basis of an information item ($I_F$) of the subsequent video program ($S_F$), those video programs ($S_G$) from the selected video programs having respective content information ($I_G$) corresponding to the information item ($I_F$) of the subsequent video program ($S_F$).

6. The method as claimed in claim 1, wherein the stored video programs ($S_i$) contain at least one compression factor ($C_i$).

7. The method as claimed in claim 1, wherein the compression factor ($C_i$) of a video program ($S_i$) is applied during the storage of the video program ($S_i$).

8. The method as claimed in claim 1, wherein the compression factor ($C_i$) of a video program ($S_i$) takes place in a separate run after the storage of the video program ($S_i$).

9. The method as claimed in claim 1, wherein the method further comprises the step of:
    the user entering an identification code.

10. The method as claimed in claim 9, wherein the video programs ($S_i$) are selected as a function of parameters assigned to the identification code.

11. The method as claimed in claim 10, wherein the parameters assigned to the identification code contain a selection of permissible content information items ($I_i$).

12. The method as claimed in claim 9, wherein a user's inputs are stored together with the identification code.

13. The method as claimed in claim 1, wherein the video programs ($S_i$) are selected as a function of the absolute time.

14. The method as claimed in claim 1, wherein the applicable compression, if any, of the video programs ($S_i$) takes place as a function of the running time of the video program ($S_i$).

15. The method as claimed in claim 1, wherein the video program ($S_i$) is compressed as a function of the information ($I_i$) about the content of the video program ($S_i$).

16. A playback device or video programs ($S_i$), said playback device comprising:
    at least one memory device for storing the video programs ($S_i$) and respective running times ($t_{Di}$) of the video programs; and
    a control unit for selecting those video programs ($S_n$) from the stored video programs ($S_i$) whose running times ($t_{Dn}$), when multiplied by any applicable compression factor ($C_n$), are shorter than or equal to N times a specified time duration ($\Delta T$), where the factor N is between 1 and 2.

17. The playback device as claimed in claim 16, wherein said playback device further comprises:
    an input unit for inputting the time duration ($\Delta T$).

18. The playback device as claimed in claim 16, wherein said playback device further comprises:
   a memory device for storing information ($I_i$) about the content, for example the genre, of the video programs ($S_i$), said memory device being connected to the control unit for selecting those video programs ($S_n$) from the selected video programs ($S_n$) whose content information ($I_G$) corresponds to a user's requirement ($I_B$).

19. The playback device as claimed in claim 16, wherein said playback device, further comprises:
   a memory device for storing at least one compression factor ($C_n$) assigned to the video programs ($S_i$).

20. The playback device as claimed in claim 16, wherein said playback device further comprises:
   an input unit for inputting a user identification code.

21. The playback device as claimed in claim 16, wherein said playback device further comprises:
   a database for storing an entered time duration ($\Delta T$) associated with an identification code and, if necessary, input ($I_B$) of an information item ($I_i$) about the content of the video programs ($S_i$).

22. The playback device as claimed in claim 16, wherein said playback device further comprises:
   a summing unit connected to the control unit.

23. The playback device as claimed in claim 16, wherein said playback device further comprises:
   at least one compression device for compressing the playback of a video program ($S_i$).

24. The playback device as claimed in claim 16, wherein said playback device further comprises:
   a device for selecting the method of compression of the video programs ($S_i$).

25. The playback device as claimed in claim 16, wherein said playback device further comprises:
   at least one memory device for temporarily storing video signals during playback.

26. The playback device as claimed in claim 16, wherein said playback device further comprises:
   a timer connected to the control unit.

* * * * *